United States Patent
Brooks et al.

(10) Patent No.: US 9,858,829 B1
(45) Date of Patent: Jan. 2, 2018

(54) SYSTEM AND METHOD FOR REDUCING TRACTION OF A VEHICLE

(71) Applicant: The United States of America, as represented by the Secretary of Homeland Security, Washington, DC (US)

(72) Inventors: Ernest Brooks, Glynco, GA (US); Lee Dubose, Glynco, GA (US)

(73) Assignee: The United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 15/281,853

(22) Filed: Sep. 30, 2016

(51) Int. Cl.
G09B 9/42 (2006.01)
G09B 9/042 (2006.01)
G09B 19/16 (2006.01)
G05D 7/06 (2006.01)

(52) U.S. Cl.
CPC ............ G09B 9/042 (2013.01); G05D 7/0623 (2013.01); G09B 19/167 (2013.01)

(58) Field of Classification Search
CPC ....... G09B 9/42; G09B 19/167; G05D 7/0623
USPC .......................................................... 434/66
See application file for complete search history.

(56) References Cited

U.S. PATENT DOCUMENTS

| | | | | |
|---|---|---|---|---|
| 2,388,114 A | * | 10/1945 | Boyce | B60S 1/68 180/313 |
| 3,779,324 A | * | 12/1973 | Kreske, Jr. | B60B 39/02 134/123 |
| 2007/0272486 A1 | * | 11/2007 | Eadie | B61K 3/02 184/3.1 |
| 2011/0220325 A1 | * | 9/2011 | Hino | B60C 23/18 165/104.19 |

OTHER PUBLICATIONS

Frank L. Roth, et al., "Frictional Properties of Rubber," Apr. 1942, U.S. Department of Commerce National Breau of Standards, vol. 28, FIG. 4, p. 444.*

* cited by examiner

Primary Examiner — Robert P Bullington
(74) Attorney, Agent, or Firm — Lavanya Ratnam; Trenton Roche; Nathan Grebasch

(57) ABSTRACT

Aspects of disclosure provide a system for reducing traction of a vehicle. The system includes a mobile controller, and a remote controller. The mobile controller is configured to control release of a liquid. The mobile controller corresponds to a vehicle and configured to direct the release of the liquid to specified wheels of the vehicle. The remote controller is in wireless communication with the mobile controller. The remote controller is configured to store a liquid release setting for the mobile controller, to receive a selection of the vehicle, and to issue a liquid release command including the liquid release setting to the mobile controller corresponding to the selected vehicle. The mobile controller corresponding to the selected vehicle is configured to initiate a release of the liquid directed to one or more wheels of the selected vehicle to reduce traction of the selected vehicle according to the liquid release setting.

20 Claims, 5 Drawing Sheets

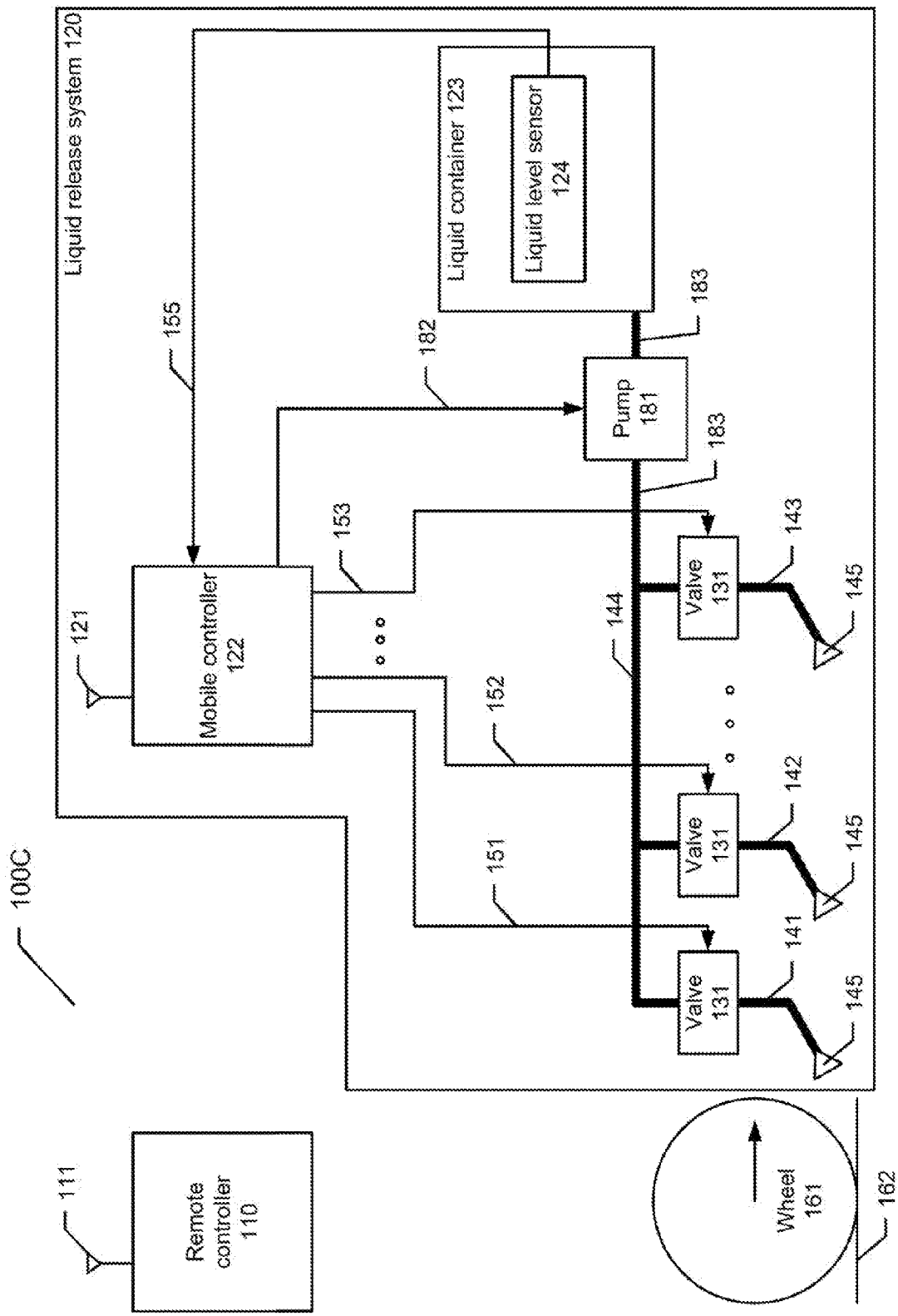

SYSTEM AND METHOD FOR REDUCING TRACTION OF A VEHICLE

BACKGROUND

Road conditions and driving behaviors, such as wet or icy roads, over accelerating, sudden braking, excessive speed while entering a curve, and the like, can cause vehicles to skid or drift, which account for many accidents and automobile related deaths. Devices simulating the skidding conditions can be used to train a driver to handle such situations and improve the driver's skill to regain control of a skidding vehicle. Such hands-on experience of recovery from a skidding situation can significantly prevent the accidents and related deaths.

SUMMARY

Aspects of the disclosure provide a system for reducing traction of a vehicle. The system includes a mobile controller, and a remote controller. The mobile controller is configured to control release of a liquid. The mobile controller corresponds to a vehicle and is configured to direct the release of the liquid to specified wheels of the vehicle. The remote controller is in wireless communication with the mobile controller. The remote controller is configured to store a liquid release setting for the mobile controller, to receive a selection of the vehicle, and to issue a liquid release command including the liquid release setting to the mobile controller corresponding to the selected vehicle. The mobile controller corresponding to the selected vehicle is configured to initiate a release of the liquid directed to one or more wheels of the selected vehicle to reduce traction of the selected vehicle according to the liquid release setting.

In an embodiment, the liquid release setting specifies one or more wheels for reducing traction, one or more lengths of time for releasing the liquid corresponding to the specified wheels, and flow rates for releasing the liquid directed to the specified wheels.

In an embodiment, the system further includes a liquid container, a conduit network in liquid connection to the liquid container and configured to discharge the liquid from the liquid container to a location in between a surface of a road and each of the one or more wheels of the vehicle carrying the mobile controller, and one or more valves for each of the one or more wheels installed on the conduit network configured to regulate liquid flows. Each of the valves including an actuator controlled by the mobile controller. In response to the liquid release command and based on the liquid release setting, the mobile controller is configured to actuate the one or more valves corresponding to the one or more wheels specified in the liquid release setting to an open position for the length of time specified in the liquid release setting.

In an example, the one or more valves are position variable valves which, during the liquid release process, actuate to an open position corresponding to a flow rate specified in the liquid release setting. In a further example, the system further includes an air compressor that compresses air into the liquid container.

In an embodiment, the system further includes a pump installed on the conduit network. In another embodiment, the system further includes a speed adjustable pump installed on the conduit network. In an example, the conduit network includes multiple branch conduits. Each branch conduit is configured to regulate a liquid flow discharged to different wheels of the vehicle. In another example, the system includes a liquid level sensor in the liquid container.

In an embodiment, the system includes a plurality of mobile controllers associated with a plurality of vehicles. Each mobile controller is configured to direct release of a liquid to specified wheels of the respective vehicle. The remote controller is in wireless communication with the plurality of the mobile controllers and configured to receive a selection of one or more mobile controllers and issue one or more liquid release commands to the one or more selected mobile controllers.

Aspects of the disclosure provide a method for reducing traction of a vehicle. The method includes receiving at a mobile controller a liquid release command carried by a wireless signal. The mobile controller corresponds to a vehicle, and the liquid release command includes a liquid release setting configured for the vehicle. The method further includes releasing a liquid from a liquid container through a conduit network directed to one or more wheels of the vehicle to reduce traction according to the liquid release setting.

Aspects of the disclosure provide another method for reducing traction of a vehicle. The method includes storing a liquid release setting for a mobile controller associated with a vehicle, receiving a selection of the vehicle, and issuing a liquid release command including the liquid release setting to the mobile controller to initiate release of a liquid directed to one of more wheels of the vehicle to reduce traction of the vehicle according to the liquid releasing setting.

BRIEF DESCRIPTION OF THE DRAWINGS

Various embodiments of this disclosure that are proposed as examples will be described in detail with reference to the following figures, wherein like numerals reference like elements, and wherein:

FIG. 1C shows a third system for reducing traction of vehicles according to an embodiment of the disclosure;

DETAILED DESCRIPTION OF EMBODIMENTS

Figure 1A:
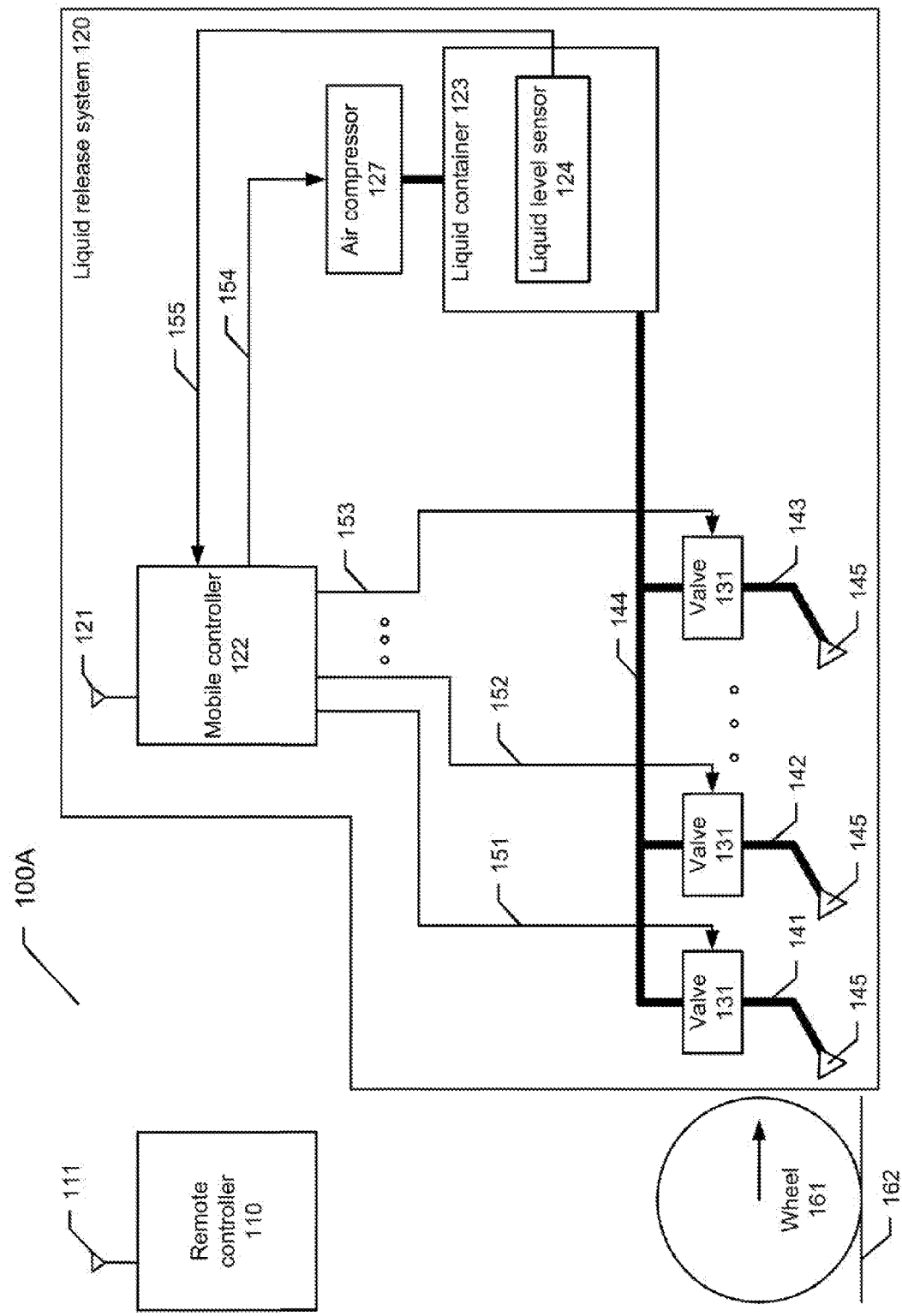
FIG. 1A shows a system for reducing traction of vehicles according to an embodiment of the disclosure.

FIG. 1A shows a system 100A for reducing traction of vehicles according to an embodiment of the disclosure. The system 100A includes a remote controller 110 and multiple liquid release systems 120 (only one liquid release system 120 is shown). Each of the liquid release systems 120 is carried in or on a vehicle. In an example, the system 100A is used to create a skidding condition in a vehicle for purposes of training a driver of the vehicle to handle the skidding situation. Specifically, an instructor of a training program can use the remote controller 110 to select a vehicle associated with one of the liquid release systems 120 to wirelessly transmit a liquid release command to the liquid release system 120. In response to the liquid release command, the liquid release system 120 may initiate a release of a liquid on a surface of a road and/or one or more wheels of the selected vehicle. The liquid reduces friction between the surface of the road and the wheels, thus causing the selected vehicle to skid. A driver of the vehicle experiences the skidding situation and learns to regain control of the skidding vehicle.

In an embodiment, the remote controller 110 is a handheld device configured to transmit a wireless signal via an antenna 111. The wireless signal carries information of a liquid release command. In an example, the remote controller 110 controlled by an instructor transmits the wireless signal directly to the liquid release system 120. In another example, the remote controller 110 controlled by an instructor transmits the wireless signal to a wireless communication network, such as a Wi-Fi network or wireless cellular communication network, which then transmits a wireless signal to the liquid release systems 120 to facilitate a communication between the remote controller 110 and the liquid release systems 120. In addition, the remote controller 110 includes input devices, such as a touch panel, a keyboard, a keypad, and the like, to receive input from an instructor, and display devices, such as a liquid crystal display (LCD), to display information to an instructor.

In an embodiment, the remote controller 110 allows an instructor to preconfigure different liquid release settings for different liquid release systems 120 and corresponding vehicles. In addition, the remote controller 110 stores the preconfigured liquid release settings in a memory of the remote controller 110. In an example, a liquid release setting for a vehicle specifies one or more wheels of the vehicle for reducing traction, lengths of time for releasing a liquid corresponding to the specified wheels, and flow rates for releasing the liquid directed to the specified wheels. Accordingly, each liquid release setting may cause one of multiple different skidding patterns corresponding to different skidding dynamics.

For example, a first liquid release setting may specify front wheels of a vehicle. Consequently, when such a release setting is included in a liquid release command and transmitted to the vehicle, a liquid release system 120 associated with the vehicle releases a liquid to the front wheels of the vehicle or to the road surface upon which the front wheels will travel, causing the front wheels to slide. Thus, a skidding pattern of understeer can occur where the vehicle steers less than an amount desired by a drive of the vehicle. On the contrary, a second liquid release setting may specify rear wheels of a vehicle. Consequently, when such a release setting is included in a liquid release command and transmitted to the vehicle, a liquid release system 120 associated with the vehicle releases a liquid to the rear wheels of the vehicle or to the road surface upon which the rear wheels will travel, causing the rear wheels to slide. Thus, a skidding pattern of oversteer takes place where the vehicle steers more than an amount desired by a drive of the vehicle.

The remote controller 110, controlled by an instructor, selects a vehicle carrying a liquid release system 120 to wirelessly issue a liquid release command to the liquid release system 120. In an example, the remote controller 110 allows an instructor to wirelessly control multiple liquid release systems during a training program, where each liquid release system can be associated with a particular vehicle. The instructor first operates the remote controller 110 to preconfigure multiple liquid release settings each corresponding to a vehicle used in the training process. The preconfigured multiple liquid release settings can be stored in a memory in the remote controller 110. Subsequently, the instructor can select a vehicle and/or a corresponding liquid release system, for example, by clicking a button representing the selected vehicle on a keypad of the remote controller, or by touching an icon indicating the selected vehicle on a touch panel of the remote controller, causing the remote controller 110 to transmit a wireless signal. Alternatively, the instruction may select a particular liquid release system from a list of possible liquid release systems, to which the wireless signal can be issued. The wireless signal carries information of the liquid release command. In an example, the remote controller 110 allows one instructor to simultaneously control multiple liquid release systems 120 and select vehicles to reduce traction in arbitrary order.

In an embodiment, a liquid release command may include a vehicle identification (ID) indicating a selected vehicle, and a liquid release setting. In the embodiment, the multiple liquid release systems 120 can operate on a same frequency. When the remote controller 110 transmits a signal using such a frequency, each liquid release system 120 uses the vehicle ID included in the liquid release command to determine if the command is targeted to itself. In other embodiments, different liquid release system can operate on different frequencies. Accordingly, a liquid release command does not necessarily include a vehicle ID. In alternative embodiments, identification information identifying a liquid release system and a corresponding vehicle is used instead of a vehicle ID.

In another embodiment, a liquid release command includes a sequence of liquid release settings in addition to a vehicle ID, or identification information identifying a liquid release system and a corresponding vehicle. For example, the sequence of liquid release settings includes a first liquid release setting corresponding to a first skidding pattern, e.g., an oversteer pattern, and a second liquid release setting corresponding to a second skidding pattern, e.g., a understeer pattern. In such a way, various skidding patterns can be created for a driver training course.

In an embodiment, the remote controller 110 allows an instructor to select a vehicle and a corresponding liquid release system 120 to wirelessly issue a stop command to stop a liquid releasing of the liquid release system 120. For example, the instructor can control a remote controller 110 to select and click a button associated with the vehicle on a touch panel or a keypad to issue the stop command. The stop command can include a vehicle ID indicating the selected vehicle and information representing a stop-releasing operation. This function of the remote controller 110 issuing a stop command can be used when an emergency situation occurs requiring an immediate termination of a liquid releasing of a vehicle.

In an embodiment, the remote controller 110 displays information of an amount of liquid in each liquid release system 120. Specifically, each liquid release system 120 includes a liquid level sensor generating information about the amount of liquid in each liquid release system 120. The liquid release system 120 transmits a wireless signal carrying the information to the remote controller 110 periodically according to a preconfigured interval. The remote controller 110 receives the information and display the information, for example, on an LCD. As a result, an instructor can know in real time the amount of liquid left in each liquid release system 120 during a training process.

The liquid release system 120 in FIG. 1A is carried in or on a vehicle. The vehicle can be a car, a truck, a sport utility vehicle (SUV), a van, and the like. In an embodiment, the liquid release system 120 includes a mobile controller 122, a liquid container 123, an air compressor 127, a conduit network 144 which includes a plurality of branch conduits 141-143, and a plurality of valves 131-133 each installed on a branch conduit 141-143.

The mobile controller 122 receives a liquid release command from the remote controller 110, and, subsequently, based on the received liquid release command, generates one or more drive voltages 151-154 to control a length of time and a flow rate for releasing a liquid to a wheel of the vehicle carrying the liquid release system 120. For example, after an instructor selects a vehicle and issues a liquid release command, a wireless signal carrying the liquid release command is transmitted from the remote controller 110. The liquid release command can include a vehicle ID (or identification information identifying a liquid release system) and a liquid releasing setting. The mobile controller 122 receives the wireless signal via an antenna 121, and extracts the liquid release command from the wireless signal. The mobile controller 122 then checks the vehicle ID or the identification information included in the liquid release command to determine if the liquid release command is issued to the liquid release system 120.

When the liquid release command is issued to the liquid release system 120, the mobile controller 122 checks the liquid release setting in the liquid release command. In an example, the liquid release setting specifies one or more wheels of the vehicle for reducing traction, lengths of time for releasing a liquid corresponding to the specified wheels, and flow rates for releasing the liquid directed to the specified wheels. Accordingly, the mobile controller 122 selects some of the valves 131-133 associated with the specified wheels for reducing traction specified in the liquid release setting, and transmits control signals (in form of drive voltages 151-153) to the selected valves. In addition, according to the lengths of time for releasing a liquid specified in the liquid release setting, the mobile controller 122 generates drive voltages 151-153 to control a length of time for each of the selected valves releasing the liquid to the selected wheels. Further, the mobile controller 122 generates drive voltages 151-153 to control positions of each selected valves thus that flow rates of those selected vales can be regulated according to the flow rates specified in the liquid release setting.

In an example, the mobile controller 122 receives a stop command from the remote controller 110, and, subsequently controls one or more drive voltages 151-154 to actuate the valves to closed positions and terminate operation of the air compressor 127 to stop releasing the liquid.

The liquid container 123 contains a liquid to be released to reduce traction of a vehicle. The liquid can be any liquid suitable for reducing friction between a surface of a road and wheels of a vehicle. In an example, the liquid is water. In another example, the liquid is a solution including water and other chemical substances that decrease the freezing point of the solution. The chemical substances can be ethylene glycol, sodium chloride, calcium chloride, magnesium chloride, and the like, or a mixture thereof. The liquid container 123 can be made of any suitable materials, such as metal materials and plastic materials. Capacity of the liquid container 123 can be determined by size of the liquid container 123 which depends on load capacity of the vehicle carrying the liquid container. In an example, the liquid container 123 is mounted in a trunk of a car. In another example, an air compressor 127 is used to compress air into the liquid container 123. Accordingly, the liquid container 123 is sealed to contain the compressed air.

It is to be appreciated that while FIG. 1A depicts a single liquid container 123, in certain embodiments, multiple liquid containers may be associated with a vehicle, where each liquid container holds a different types of liquid. In this example, an instructor may define a first liquid release setting that controls releasing of a first type of liquid for a certain length of time, and also define a second liquid release setting that controls releasing of a second type of liquid for a certain length of time. Accordingly, by varying the different types of liquids release, the instructor can simulate rapidly changing conditions on the roadway and cause the driver to learn the appropriate response for each type of friction level provided by the different liquids.

Moreover, in certain embodiments, remote controller 110 may contain a temperature sensor or other such sensor capable of determining atmospheric conditions, and remote controller 110 may indicate to the instructor via a display device a recommendation for the use of a first type of liquid over a second type of liquid, based on the temperature of other such atmospheric condition. Remote controller 110 may provide such recommendations based on defined rules or criteria that may be configurable depending on the types of liquids included with a particular liquid release system.

In an embodiment, the liquid container 123 includes a liquid level sensor 124. The liquid sensor 124 periodically generates a signal 155 indicating an amount of liquid contained in the liquid container 123, and transmits the signal to the mobile controller 122. Based on the received signal 155, the mobile controller 122 transmits a wireless signal carrying information of the amount of liquid to the remote controller 110. As a result, the remote controller 110 displays the information of the amount of liquid left in the liquid container 123 to the instructor. In various embodiments, the liquid level sensor 124 can be a capacitance level sensor, ultrasonic level sensor, a resistance chain level sensor, and the like.

The air compressor 127 compresses air into the liquid container 123 via a conduit 128. The air compressor 127 can be used to increase flow rate of liquid in the conduit network 144 causing more fluid to be supplied to multiple wheels during a time interval. The air compressor 127 can be of a positive displacement type, e.g., rotary screw compressors, or a positive displacement type, e.g., centrifugal compressors. The mobile controller 122 generates a drive voltage 154 to supply power to drive the air compressor 127. In an example, the air compressor 127 starts to operate when mobile controller 122 is powered on, and compressed air is generated and stored in a tank in advance of a liquid releasing operation. In another example, starting of the air compressing operation is remotely controlled by an instructor using the remote controller 110. The mobile controller 122 receives an air compressing command from the remote controller 110 and generates the drive voltage to start an operation of the air compressor 127. In an embodiment, the liquid release system 122 does not include an air compressor 127, and liquid in the liquid container 123 flows to each selected wheel relying on gravity of the liquid.

The conduit network 144 delivers and regulates the liquid to wheels of the vehicle carrying the liquid release system 120 to reduce traction of the vehicle. The conduit network 144 is in liquid connection to the liquid container 123. In an embodiment, the conduit network 144 includes multiple branch conduits 141-143 as shown in FIG. 1A. Each of the multiple branch conduits 141-143 channels the liquid to a wheel, and discharges the liquid in between a surface of a road and the wheel to reduce friction between the surface of the road and the wheel. For example, the branch conduit 141 channels the liquid to a wheel 161 in FIG. 1A, and releases the liquid in between a surface 162 of a road and the wheel 161 to reduce traction of the wheel 161.

In an embodiment, each of the branch conduits includes a nozzle 145 having, for example, a duckbill shape at outlet of the branch conduit, such that the liquid can be sprayed along width direction of a tread area of a tire on a wheel. In an example, outlets of each branch conduits 141-143 are positioned in front of the wheels receiving liquid with respect to a direction the wheels are moving in. In an example, some of the multiple branch conduits each releases liquid to a group of wheels, such as two rear wheels mounted on the same end of an axel of a truck.

The conduits in the conduit network 144 can be made of any suitable materials such as metal materials, plastic materials, and the like, and can be mounted on the lower part of the body of a vehicle, such as a frame of a vehicle. Cross-sectional area of the conduits in the conduit network 144 can vary in different embodiments and depends on levels of flow rates required for different types of vehicles and training programs.

The plurality of valves 131-133 are each installed on a branch conduit 141-143 of the conduit network 144 to regulate a liquid flow in the branch conduit 141-143. Each of the plurality of valves 131-133 can include an actuator. Depending on a liquid release setting received at the mobile controller 122, and controlled by the corresponding drive voltages 151-153 generated by the mobile controller 122, the actuator can actuate a corresponding valve 131-133 to operate on different open positions corresponding to different flow rates. In addition, depending on the liquid releasing setting and the drive voltages 151-153, a part of the valves for delivering liquid to wheels specified in the liquid release setting may be actuated to be in an open position, while at the same time the other part of the valves for delivering liquid to other wheels not specified in the liquid release setting may not receive driving voltages thus staying at a closed position. Further, controlled by the drive voltages 151-153, different valves that are actuated to be in open positions may last for different length of times before being actuated to a closed position according to different lengths of time specified for different wheels in the liquid releasing setting.

In an embodiment, the plurality of values 131-133 includes valves having two operation positions (referred to as two-position valves): a fully open position allowing liquid flow to pass through the valve, and a closed position blocking the liquid from passing through. In various embodiments, the two-position valves can be of various types. In an example, the two-position valves are solenoid valves. Generally, a solenoid valve is an electromechanically operated valve having a solenoid actuator. The solenoid actuator is controlled by an electric current through a solenoid coil that, when energized or un-energized, moves a plunger in the valve to a different operation position. A solenoid valve can be driven with direct current or alternating current. In another example, the two-position valves are a motorized valve. The motorized valve includes an actuator that includes an electric motor. The electric motor drives a plunger in the valve to an open or closed position.

In another embodiment, the plurality of the vales 131-133 includes position-variable valves (also referred to as modulating valves). Controlled by the drive voltages 151-153, the position-variable valves can be adjusted to intermediate positions between a fully open position and a fully closed position, thus regulating liquid flow in the branch conduits 131-133 to flow rates specified in a liquid release setting. In an example, the position-variable valves are motorized valves and each includes an electric motor in its actuator. The electric motor can drive a plunger in a motorized valve to different positions corresponding to different flow rates. In a further embodiment, the plurality of the values 131-133 employs different type of valves, such as the two-position valves and the position-variable valves described above.

In various embodiments, when different types of valves are utilized, the mobile controller 122 accordingly generates drive voltages 151-153 suitable for driving the different types of valves, such as the two-position valves and the position-variable valves described above.

Figure 1B:
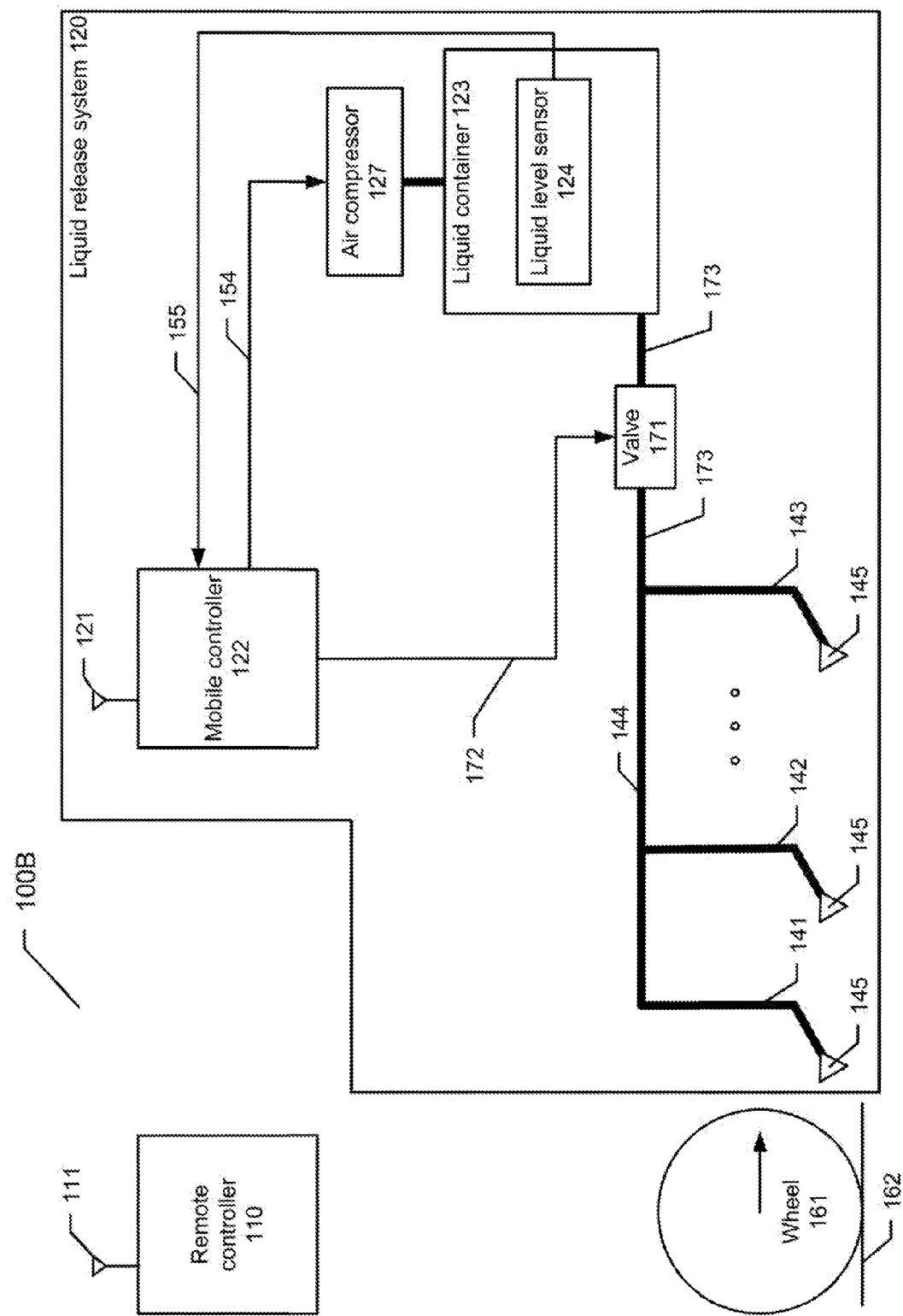
FIG. 1B shows another system for reducing traction of vehicles according to an embodiment of the disclosure.

FIG. 1B shows another system 100B for reducing traction of vehicles according to an embodiment of the disclosure. The system 100B is similar to the system 100A, however, the plurality of valves 131-133 is substituted by a valve 171 installed on a main conduit 173 that connects the branch conduits 141-143 to the liquid container 123. Accordingly, the mobile controller 122 generates a drive voltage 172 to control the valve 171. In one example, the valve 171 is a two-position valve having an open position and a closed position. In another example, the valve 171 is a position variable valve that can be adjusted to allow different flow rates.

Under the configuration of FIG. 1B, one valve 171 is used to regulate multiple liquid flows released to different wheels. Consequently, liquid releasing settings configured for the system 100B may not include information about which wheels whose traction are to be reduced, but defines a length of time and a flow rate for releasing the liquid to the different wheels when the valve 171 is a position variable valve, or defines a length of time for releasing the liquid to the different wheels when the valve 171 is a two-position valve. Accordingly, the mobile controller 122 can generate suitable drive voltages 153 corresponding to different liquid release settings and different types of valves.

FIG. 1C shows a third system 100C for reducing traction of vehicles according to an embodiment of the disclosure. The system 100C is similar to the system 100A, however, the air compressor 127 is substituted by a pump 181 to provide thrust to move the liquid. In an example, the pump 181 is a speed-variable pump 181 installed on a main conduit 183 that connects the branch conduits 141-143 to the liquid container 123. The speed-variable pump 181 can include an electric motor driven by a drive voltage 182 generated at the mobile controller 122. The speed-variable pump 181 can work at variable operating speed to regulate liquid flow to different flow rate proportional to the operating speed. During a training process, an instructor may issue commands include different liquid release settings, and a sum of the flow rates in the plurality of branch conduits 141-143 may vary according to different liquid release settings. Accordingly, the mobile controller 122 may generate drive voltages to adjust the operating speed of the speed-variable pump 181 to facilitate a flow rate in the main conduit 183 that matches the sum of the flow rates in the branch conduits 141-143.

In various embodiments, the speed-variable pump 181 can be of any suitable types, such as positive displacement, roto-dynamic, and the like, and can require different drives. Accordingly, the mobile controller 122 generates various drive voltages 182 to drive the variable speed-variable pumps 181. In an example, the mobile controller 122 generates variable frequency drive voltage using a pulse-width modulated (PWM) frequency converter.

In an alternative embodiment, the system 100C does not include the plurality of valves 131-133, and the pump 181 is used to control a flow rate and a length of time for releasing liquid to all wheels.

Figures 2A, 2B:
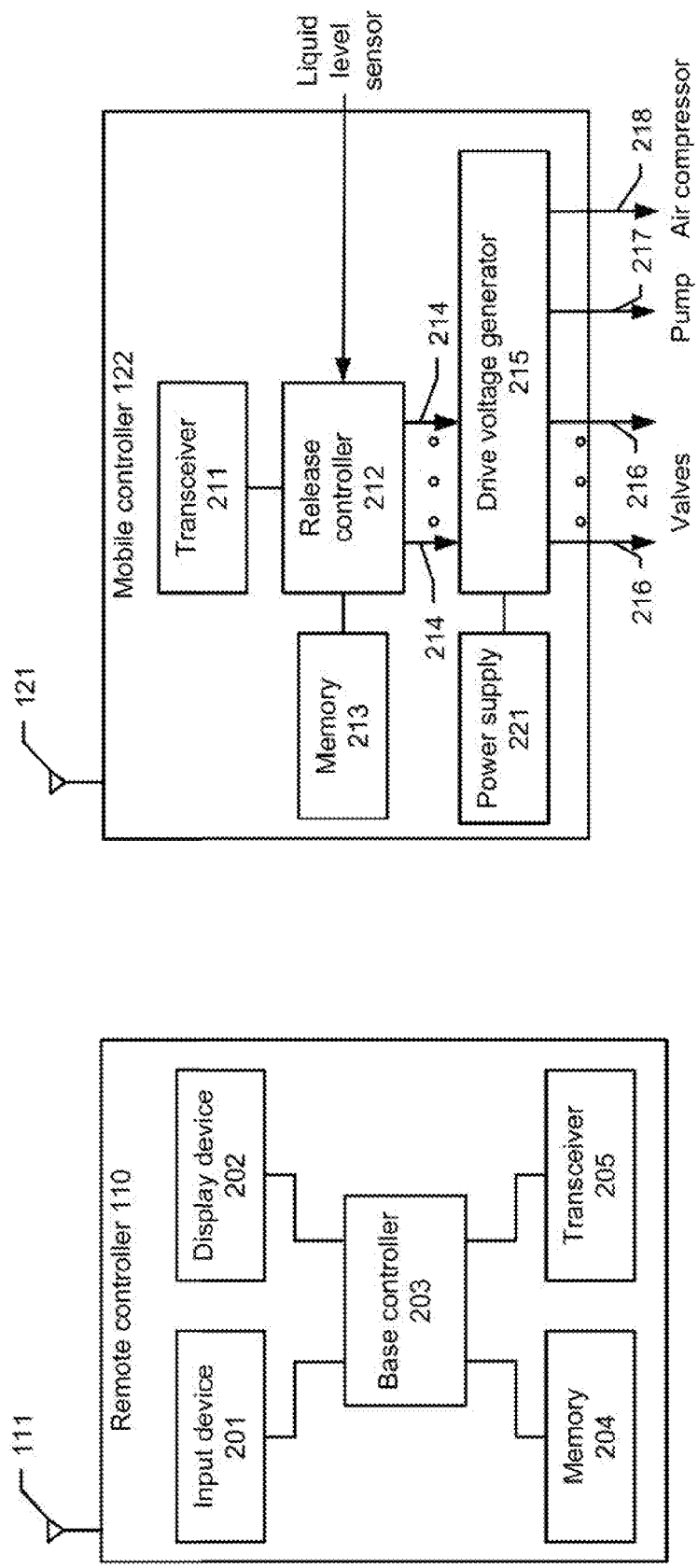
FIG. 2A shows a remote controller according to an embodiment of the disclosure.
FIG. 2B shows a mobile controller according to an embodiment of the disclosure.

FIG. 2A shows an exemplary remote controller 110 according to an embodiment of the disclosure. The remote controller 110 can include an input device 201, a display device 202, a base controller 203, a memory 204, a transceiver 205 and an antenna 111. The input device 201 can be a keyboard, a keypad, a touch panel, and the like. The input device 201 receives input information from an instructor and allows the instructor to preconfigure multiple liquid release settings each corresponding to one of multiple vehicles carrying a liquid release system. In addition, the input device 201 allows the instructor to select one of the multiple vehicles to issue a liquid release command or a stop command to the selected vehicle, for example, by clicking a button of the input device 201.

The display device 202 can be an LCD, or other types of display devices in various embodiments. In an example, the display device 202 displays an interface to allow an instructor to preconfigure a liquid releasing setting and issue a command. In addition, the display device 202 can display information of an amount of liquid contained in liquid containers carried by different vehicles.

In an example, the base controller 203 generates the interface displayed at the display device 202. In addition, the base controller 203 receives input information from the input device 201, and accordingly performs various functions, such as storing the preconfigured liquid release settings in the memory 204, and, when an instructor issues a command, generating a signal carrying information of the command and transmitting the signal to the transceiver 205. Further, the base controller 203 can receives a signal carrying information of an amount of liquid in a liquid container, and display the information to the display device 202. In one embodiment, the base controller 203 is implemented using hardware, such as application specific interested circuits (ASICs), field programmable gate arrays (FPGA), and the like. In another embodiment, the base controller 203 is implemented using a general purpose processor executing software program instructions.

In an embodiment, the memory 204 can include a volatile memory, such as a random accessible memory (RAM), or a non-volatile memory, such as a flash memory. The memory 204 stores the preconfigured liquid release settings each associated with a vehicle carrying a liquid release system 120. In addition, the memory 204 may store software program instructions executed by the base controller 203, including instructions for causing base controller 203 to perform steps consistent with embodiments disclosed herein.

In an embodiment, the transceiver 205 receives a signal from the base controller 203 carrying information of a liquid release command or a stop command, and transmits a wireless signal carrying the information of a liquid release command or a stop command via the antenna 111. In addition, the transceiver 205 receives a signal carrying information of an amount of liquid in a liquid container from outside the remote controller 110 via the antenna 111, and transmits a signal carrying the information to the base controller 203. The transceiver 205 can include suitable components to perform its functions, such as encoder/decoder, modulator/demodulator, and amplifiers for processing to-be-transmitted signals or received signals. In an alternative embodiment, the remote controller 110 includes a transmitter instead of the transceiver, thus only capable of transmitting information from the remote controller 110.

In an embodiment, the remote controller 110 and the liquid release system 120 communicate via a wireless communication network, such as a Wi-Fi network, a cellular communication network, and the like. Accordingly, the transceiver 205 includes circuits enabling the transceiver 205 to operate with various communication protocols associated with the wireless communication networks.

FIG. 2B shows an exemplary mobile controller 122 according to an embodiment of the disclosure. The mobile controller 122 can include a transceiver 211, a release controller 212, a memory 213, a drive voltage generator 214, a power supply 221, and an antenna 121. The transceiver 211 has structures and functions similar to the transceiver 205 in FIG. 2A, and receives and transmits wireless signals using the antenna 121. The transceiver 211 facilitates the release controller 212 to receive commands issued from the remote controller 110 and transmit information of an amount of liquid in a liquid container associated with the liquid release system 120.

The release controller 212 receives signals carrying commands issued from the remote controller 110 and generates control signals 214 accordingly for drive voltage generating operation performed by the drive voltage generator 215. In an example, when a command is received, the release controller 212 first checks a vehicle ID in the command to determine if the command is issued to a vehicle associated with the release controller 212. When a liquid release command is determined to be a command issued to the vehicle, the release controller 212 checks a liquid release setting in the liquid release command, and accordingly generates one or more control signals 214 to implement the specification for releasing a liquid included in the liquid release settings.

In an embodiment, the release controller 212 receives a signal 219 indicating an amount of liquid in a liquid container associated with the mobile controller 122, and transmits information of the amount of liquid to the remote controller 110 via the transceiver 211. In various embodiments, the release controller 212 can be implemented using hardware, e.g., ASIC, FPGA, and the like, or software executed by a general purpose processor.

The memory 213 can include a volatile memory, such as a RAM, or a non-volatile memory, such as a flash memory, and store software programs executed by a general purpose processor to perform related functions of the release controller 212, such as instructions for causing release controller 212 to perform steps consistent with embodiments disclosed herein. The memory 213 can also store other software programs for performing functions of other elements in the mobile controller 212.

The drive voltage generator 215, controlled by the control signals 214, generates drive voltages 216-218 to control operations of valves, pumps, and air compressors described in FIGS. 1A/1B/1C to implement liquid release settings received from the liquid release system 110. In various embodiments, the drive voltage generator 215 can include various drive voltage generating circuits that receive power from the power supply 221, and generate drive voltages 216-218 suitable for driving valves, pumps and air compressors of various types. In a first example, the drive voltage generator 215 includes a circuit generating drive voltages 216 suitable for drive solenoid valves. Specifically, the circuit generates multiple drive voltages 216 at multiple output ports. Each output port is connected to a solenoid valve with a switch installed between each output port and a corresponding solenoid valve. In an example, the switch is a solid state relay. Each switch is controlled by a control signal 214 generated at the release controller 212. Based on information specified in a liquid release setting, such as wheels for reducing traction and lengths of time for releasing a liquid corresponding to the wheels, the control signals 214 turn on the switches corresponding to the wheels specified in the liquid release setting to impose drive voltages 216 to corresponding solenoid valves. In addition, the control signals 214 keep each switch at a turn on status for a length of time specified in the liquid releasing setting, such that a releasing operation of a solenoid valve will last for the length of time specified in the liquid releasing setting.

In a second example, motorized position variable valves are used instead of solenoid valves, and the drive voltage generator 215 includes a circuit generating drive voltages 216 suitable for drive the motorized valves. Specifically, the circuit generates multiple drive voltages 216 at multiple output ports. Each motorized valve is connected to two output ports each generating an opposite drive voltage 216. A switch, such as a solid state relay, is installed between each output port and the corresponding motorized valve. Each switch is controlled by a control signal 214 generated at the release controller 212. Accordingly, during a process for regulating a flow rate of a motorized valve, a first control signal 214 can first turn on a first switch for a specific period such that a drive voltage 216 controlled by the first switch drives the motorized valves to an open position corresponding to a flow rate specified in a liquid release setting. Then, after the motorized valve operates on the open position for a length of time specified in the liquid release setting, a second control signal 214 can turn on a second switch such that an opposite drive voltage 216 can drive the motorized valve to a closed position.

In a third example, the drive voltage generator 215 includes a circuit generating a drive voltage 217 suitable for drive a speed-variable pump. Specifically, the circuit includes a PWM frequency converter. The converter generates a drive voltage 217 proportional to the frequency of a PWM signal. Accordingly, the release controller 212 can generate a control signal 214 to control a PWM signal generating circuit to generate a PWM signal having a specific frequency, and consequently causes the speed-variable pump to operate at a specific speed corresponding to a flow rate specified in a liquid releasing setting. In a fourth example, the drive voltage generator 215 includes a circuit generating a drive voltage 218 suitable for drive an air compressor that includes an electric motor The power supply 221 provides power to the drive voltage generator 215. In various embodiments, the power supply 221 can take various forms depending on types of vehicles, requirements of the training programs, or other factors. In an example, the power supply 221 includes a battery of the vehicle that carries the mobile controller 122. The battery can be recharged by an electric generator driven by an engine of the vehicle. In another example, the power supply 221 is a stand-alone rechargeable battery can be charged with power supplies other than the vehicle. In a further example, the power supply 221 is an electric generator, such as a diesel generator, consuming fuel.

Figure 3:
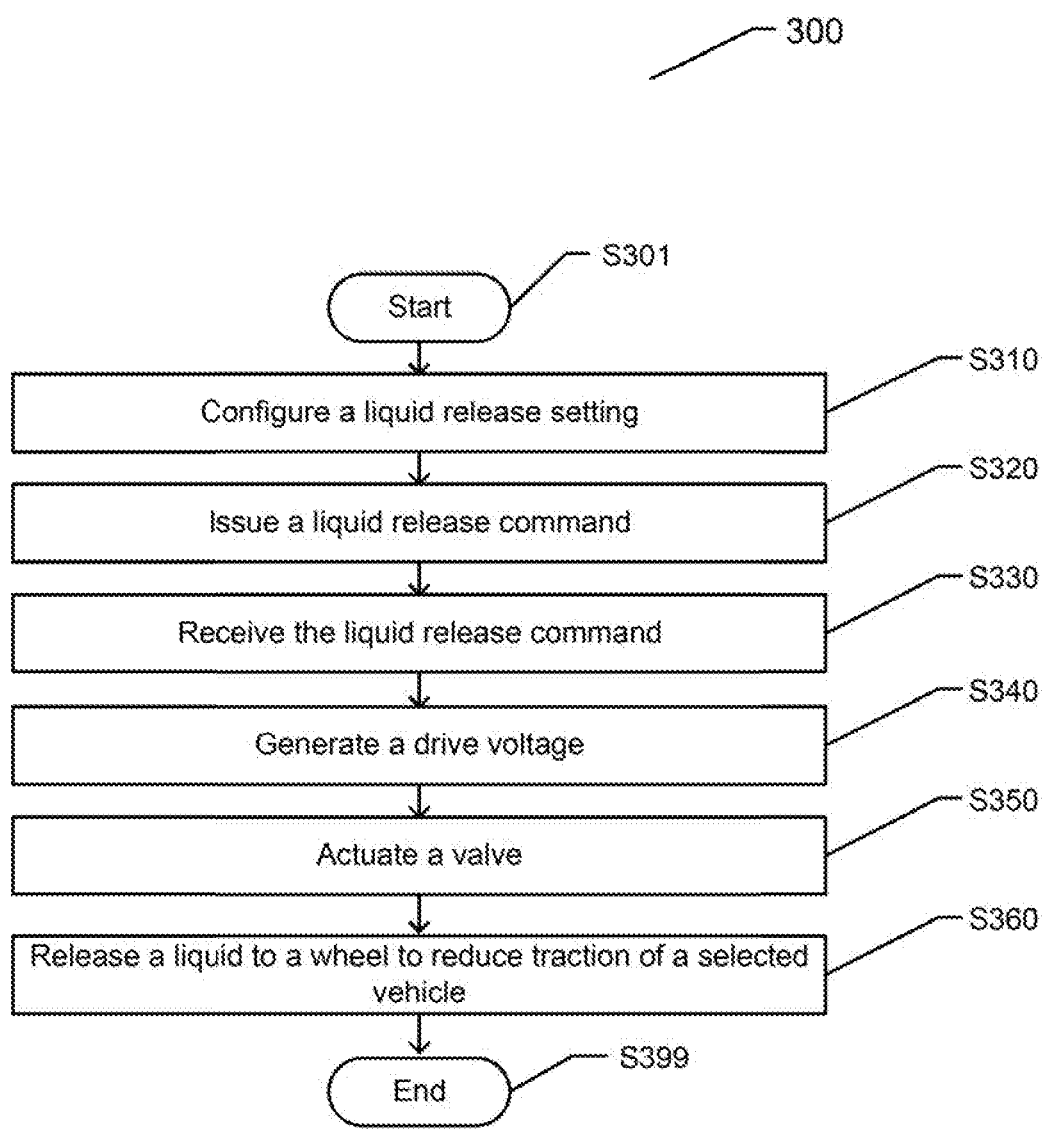
FIG. 3 shows a process for reducing traction of vehicles according to an embodiment of the disclosure.

FIG. 3 shows a process 300 for reducing traction of vehicles according to an embodiment of the disclosure. The process 300 starts at S301 and proceeds to S310.

At S310, a liquid release setting is configured for each of one or more vehicles and corresponding liquid release systems by an instructor operating a remote controller. Each of the one or more vehicles is associated with a liquid release system. The instructor wirelessly controls the one or more liquid release systems using the remote controller. The liquid release settings may be stored in a memory in the remote controller.

At S320, one of the vehicles each carrying a liquid release system is selected by the instructor, and a liquid release command is issued to the liquid release system carried by the selected vehicle. Specifically, information of the liquid release command is carried by a wireless signal that is transmitted from the remote controller to the liquid release system associated with the selected vehicle. In addition, the liquid release command includes a vehicle ID indicating the selected vehicle, or identification information identifying the selected liquid release system and the selected vehicle, and a liquid release setting.

At S330, the liquid release command is received at a mobile controller of each of the one or more liquid release systems. In certain embodiments, the mobile controller of each liquid release system can check the vehicle ID or the identification information to determine whether the liquid releasing command is intended for the liquid release system, and may disregard the liquid release command if the liquid release system determines that the liquid release command is intended for a different liquid release system.

At S340, at the selected vehicle, one or more drive voltages suitable for driving one or more valves, a pump, or an air compressor are generated based on the liquid release setting.

At S350, at the selected vehicle, valves installed on a conduit network are actuated by the drive voltages generated at S340 to an open position according to the liquid release setting. Specifically, valves corresponding to wheels specified in the liquid release setting are selected to be actuated, and the actuated valves are kept in the open position for a time length specified in the liquid release setting. In addition, when position variable vales are used, the position variable calves are actuated to an open position corresponding to a flow rate specified in the liquid release setting. Additionally or alternatively, an air compressor or a pump is actuated and driven by one of the drive voltages generated at S340.

At S360, at the selected vehicle, a liquid is released from a liquid container via a conduit network to reduce traction of the selected vehicle according to the liquid release setting. Specifically, the liquid is discharged in between a surface of a road and wheels of the selected vehicle. The process 300 proceeds to S399, and terminated at S399.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A mobile controller for reducing traction of a vehicle, comprising:
  processing circuitry configured to:
    receive a liquid release command including a liquid release setting and identification information from a remote controller;
    determine whether the identification information included in the liquid release command identifies the vehicle; and
    initiate a release of a liquid directed to one or more wheels of the vehicle to reduce the traction of the vehicle according to the liquid release setting after determining that the identification information included in the liquid release command identifies the vehicle.

2. The mobile controller of claim 1, wherein the liquid release setting specifies:
the one or more wheels for reducing the traction of the vehicle;
one or more lengths of time for releasing the liquid directed to the one or more wheels; and
flow rates for releasing the liquid directed to the one or more wheels.

3. The mobile controller of claim 2, wherein the processing circuitry is further configured to control:
the release of the liquid from a liquid container to a location in between a surface of a road and each of the one or more wheels of the vehicle carrying the mobile controller; and
an actuator for each of one or more valves corresponding to each of the one or more wheels and installed on a conduit network to regulate liquid flows,
wherein, in response to the liquid release command and based on the liquid release setting, the processing circuitry is configured to actuate the one or more valves corresponding to the one or more wheels specified in the liquid release setting to an open position for the one or more lengths of time specified in the liquid release setting.

4. A system for reducing traction of a vehicle, comprising:
a mobile controller corresponding to the vehicle; and
a remote controller in wireless communication with the mobile controller and configured to select the vehicle and transmit a liquid release command including a liquid release setting and identification information to the mobile controller,
wherein the mobile controller determines whether the identification information included in the liquid release command identifies the vehicle, and
wherein, according to the liquid release setting, the mobile controller initiates a release of a liquid directed to one or more wheels of the vehicle to reduce the traction of the vehicle when the mobile controller determines that the identification information included in the liquid release command identifies the vehicle.

5. The system of claim 4, wherein the liquid release setting specifies:
the one or more wheels for reducing the traction of the vehicle;
one or more lengths of time for releasing the liquid directed to the one or more wheels; and
flow rates for releasing the liquid directed to the one or more wheels.

6. The system of claim 5, wherein the mobile controller is further configured to control:
the release of the liquid from a liquid container to a location in between a surface of a road and each of the one or more wheels of the vehicle carrying the mobile controller; and
an actuator for each of one or more valves corresponding to each of the one or more wheels and installed on a conduit network to regulate liquid flows,
wherein, in response to the liquid release command and based on the liquid release setting, the mobile controller is configured to actuate the one or more valves corresponding to the one or more wheels specified in the liquid release setting to an open position for the one or more lengths of time specified in the liquid release setting.

7. The system of claim 6, wherein the one or more valves are position variable valves which, during the release of the liquid, actuate to the open position corresponding to the flow rates specified in the liquid release setting.

8. The system of claim 6, further comprising a speed adjustable pump installed on the conduit network.

9. The system of claim 6, wherein the conduit network includes multiple branch conduits, and each branch conduit is configured to regulate the liquid flows discharged to the one or more wheels of the vehicle.

10. The system of claim 4, further comprising:
a plurality of mobile controllers corresponding to a plurality of vehicles,
wherein each of the plurality of mobile controllers is configured to direct a release of a corresponding liquid to a corresponding one or more wheels of a corresponding vehicle, and
the remote controller is in wireless communication with the plurality of mobile controllers and is configured to issue one or more corresponding liquid release commands to the one or more of the plurality of mobile controllers.

11. A method for reducing traction of a vehicle, comprising:
receiving at a mobile controller corresponding to the vehicle, a liquid release command, wherein the liquid release command includes a liquid release setting and identification information;
determining whether the identification information included in the liquid release command identifies the vehicle; and
releasing a liquid from a liquid container through a conduit network directed to one or more wheels of the vehicle to reduce the traction of the vehicle according to the liquid release setting after determining that the identification information included in the liquid release command identifies the vehicle.

12. The method of claim 11, wherein the liquid release setting specifies:
the one or more wheels for reducing the traction of the vehicle;
one or more lengths of time for releasing the liquid directed to the one or more wheels; and
flow rates for releasing the liquid directed to the one or more wheels.

13. The method of claim 12, further comprising:
generating one or more drive voltages suitable for driving one or more valves, a pump, or an air compressor based on the liquid release setting.

14. The method of claim 13, wherein the one or more valves can actuate to either an open position or a closed position.

15. The method of claim 14, further comprising:
actuating, by the one or more drive voltages, the one or more valves to the open position for the one or more lengths of time specified in the liquid release setting, the one or more valves corresponding to the one or more wheels specified in the liquid release setting.

16. The method of claim 15, wherein the one or more valves include one or more position variable valves, and the actuating, by the one or more drive voltages, the one or more valves to the open position further includes actuating the one or more position variable valves to the open position corresponding to a flow rate specified in the liquid release setting.

17. The method of claim 13, further comprising:
driving the air compressor to compress air into the liquid container.

18. The method of claim 13, further comprising:
driving the pump installed on the conduit network to release the liquid from the liquid container.

19. The method of claim 18, further comprising:
driving a speed adjustable pump on the conduit network to control a level of a flow rate of a release of the liquid.

20. A method for reducing traction of a vehicle, comprising:
storing a liquid release setting for a mobile controller associated with the vehicle;
receiving a selection of the vehicle; and
issuing a liquid release command including the liquid release setting and identification information to the mobile controller to initiate a release of a liquid directed to one of more wheels of the vehicle to reduce the traction of the vehicle according to the liquid releasing setting,
wherein the liquid is initiated to be released after determining that the identification information included in the liquid release command identifies the vehicle.

\* \* \* \* \*